(12) United States Patent
Wehunt et al.

(10) Patent No.: US 12,202,398 B2
(45) Date of Patent: Jan. 21, 2025

(54) VEHICLE SIDE FACING LIGHTING

(71) Applicants: Daniel Wehunt, Lancaster, CA (US); Christopher Wehunt, Lancaster, CA (US)

(72) Inventors: Daniel Wehunt, Lancaster, CA (US); Christopher Wehunt, Lancaster, CA (US)

( * ) Notice: Subject to any disclaimer, the term of this patent is extended or adjusted under 35 U.S.C. 154(b) by 0 days.

(21) Appl. No.: 18/169,835

(22) Filed: Feb. 15, 2023

(65) Prior Publication Data
US 2024/0270159 A1    Aug. 15, 2024

(51) Int. Cl.
*B60Q 1/00* (2006.01)
*B60Q 1/24* (2006.01)
*B60Q 1/26* (2006.01)
*F21S 41/29* (2018.01)

(52) U.S. Cl.
CPC ......... *B60Q 1/2619* (2013.01); *B60Q 1/0017* (2013.01); *B60Q 1/24* (2013.01); *F21S 41/29* (2018.01)

(58) Field of Classification Search
CPC ........ B60Q 1/32; B60Q 1/247; B60Q 1/2611; B60Q 1/0035; B60Q 1/30; F21W 2103/15; F21W 2103/20; F21W 2103/55; F21W 2107/10; F21W 2107/20; F21S 10/06; F21S 43/14; F21V 13/04; F21V 17/12; F21V 29/67; F21V 31/005; F21V 5/048; F21V 7/00; F21Y 2115/10; F21Y 2113/13; B60R 9/04

USPC ........ 362/240, 300, 384, 509, 546; 224/309
See application file for complete search history.

(56) References Cited

U.S. PATENT DOCUMENTS

| | | | | |
|---|---|---|---|---|
| 2,280,275 A | * | 4/1942 | Young .................. | B60Q 1/2607 362/240 |
| 2,640,910 A | * | 6/1953 | Talley .................. | B60Q 1/0035 362/546 |
| 10,759,330 B1 | * | 9/2020 | Salter ................... | B60Q 1/2611 |
| 2016/0121799 A1 | * | 5/2016 | Mcclintock .......... | B60Q 1/2661 224/309 |
| 2018/0009513 A1 | * | 1/2018 | Christensen .......... | F21V 31/005 |

FOREIGN PATENT DOCUMENTS

CN        201033555 Y  *  3/2008

OTHER PUBLICATIONS

Search English translation of CN 201033555 Y (Year: 2008).*

* cited by examiner

*Primary Examiner* — Omar Rojas Cadima
(74) *Attorney, Agent, or Firm* — Miller IP Law; Devin Miller

(57) ABSTRACT

Described herein are examples of devices which include a tie-down bracket including side-facing lighting. The side-facing lighting is configured to provide lighting and illumination in the lateral direction of the movement of the vehicle. The side-facing lighting assembly components are prepared from a light source, a gasket, a lens, and a bezel.

20 Claims, 5 Drawing Sheets

VEHICLE SIDE FACING LIGHTING

BACKGROUND

Vehicle lighting has been changing and progressing since the first Model T rolled off Ford's assembly line. Lighting is used as a safety feature to signal other drivers and to provide illumination for the driver to navigate the roadway. Standard vehicle lighting provides front facing lights to illuminate the area directly in-front of the driver, and rear facing lighting to warn other drivers that a vehicle is in the road. Additionally, vehicle light has been used to signal that a vehicle may be turning or slowing down.

BRIEF DESCRIPTION OF THE DRAWINGS

The present description will be understood more fully when viewed in conjunction with the accompanying drawings of various examples of vehicle side-facing lighting. The description is not meant to limit the vehicle side-facing lighting to the specific examples. Rather, the specific examples depicted and described are provided for explanation and understanding of vehicle side-facing lighting. Throughout the description the drawings may be referred to as drawings, figures, and/or FIGS.

DETAILED DESCRIPTION

Vehicle side-facing lighting as disclosed herein will become better understood through a review of the following detailed description in conjunction with the figures. The detailed description and figures provide merely examples of the various embodiments of vehicle side-facing lighting. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional vehicle lighting generally includes forward and rear facing lighting assemblies or lighting systems intended to provide illumination for the driver and signal others (drivers or pedestrians) that are directly in front of the vehicle or directly behind the vehicle. Historically, these lighting systems were originally incandescent lighting systems, followed by halogen or light emitting diodes (LEDs) lighting systems, and more recently many lighting systems are constructed from LEDs.

While lighting systems have improved creating brighter, stronger, and more piercing lighting (for foggy, cloudy, obscuring weather) the primary goal of modern vehicle lighting systems is to provide forward or rear facing lighting.

Off road vehicle enthusiasts, and individuals interested in aesthetic qualities of lighting have long desired side-facing lighting systems to provide illumination and/or aesthetic decorations to vehicles. While after market modifications can be prepared to achieve some of these needs, there is a market need for adaptable, efficient, and cost-effective side-facing lighting for vehicles. This need exists for both standard factory installed parts, as well as post-market additions to vehicles.

Implementation of vehicle side-facing lighting may address some or all of the problems described above. A vehicle side-facing lighting system can high level illumination that projects laterally from the side of a vehicle (generally perpendicular to direction of driving) to assist off-road vehicles in wooded, rocky, or otherwise difficult to navigate environments. A side-facing lighting system can provide aesthetic features to customize and adapt a vehicle for normal street driving. Additionally, side-facing lighting can provide a safe work or camping environment for outdoor enthusiasts.

Specifically, LED lighting systems can be adapted to provide lighting in multiple color ranges that provide high intensity with minimal electrical needs. Further, LED lighting systems can be incorporated into standard factory issued parts allowing for easy modifications to existing vehicles. Additionally, side-facing lighting systems can be directly incorporated into standard factory parts to be provided as standard features of factory model vehicles.

Figure 1:
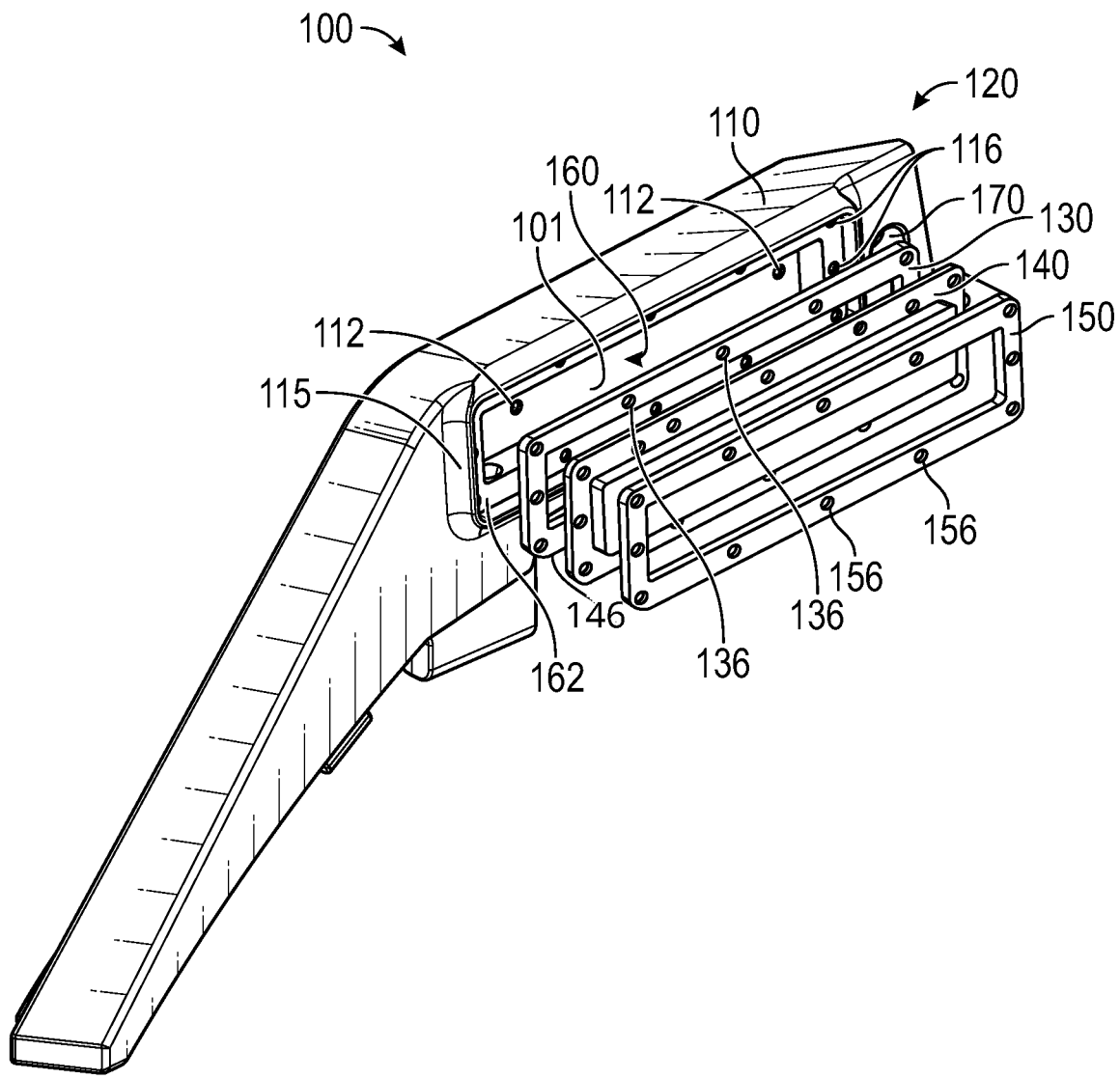
FIG. 1 illustrates a tie-down bracket with side facing lighting, according to an embodiment.

FIG. 1 illustrates an exploded view of a tie-down bracket with side facing lighting 100, including a tie-down bracket frame 110, a light source 120, a gasket 130, a lens 140 and a bezel 150 (herein after "the lighting assembly components"). The tie-down bracket frame 110 further includes a cavity 160 disposed within a surface of the tie-down bracket frame 110 configured for receiving the light source 120, gasket 130, lens 140 and bezel 150. In an embodiment, the lighting assembly components are disposed within the cavity 160 of the tie-down bracket frame 110. The cavity 160 is further configured to receive wiring (not shown) configured to power and control the light source 120.

The tie-down bracket frame 110 includes a raised lip 115 that is configured to accommodate the lighting assembly components. The size, shape, contours, and features of the raised lip 115 can be varied to provide protection to the lighting assembly components and/or ease of assembly for the lighting assembly components with the tie-down bracket frame 110. Embodiments of the raised lip 115 can be rounded, square, triangular, or other suitable shapes. Embodiments of the raised lip 115 can protrude outwardly from the tie-down bracket. An embodiment can protrude from the tie-down bracket frame 110.

The cavity 160 of the tie-down bracket frame 110 further includes cavity apertures 116 disposed on an exterior cavity surface lighting assembly composition for attachment of the gasket 130 to the tie-down bracket frame 110. Alternatively, the gasket 130 can directly attach to the light source 120 that can be affixed to the interior cavity surface 161 of the tie-down bracket frame 110. In an embodiment the cavity 160 is greater in length than in height. In such an embodiment the cavity 160 can have between 2 and 50 cavity apertures 116 disposed in an exterior cavity surface 162, preferably between 4 and 25, and most preferably between 6 and 15 cavity apertures 116. Embodiments can include ten cavity apertures 116. The exterior cavity surface 162 is configured to be affixed to either a light source frame 128 or a gasket 130.

The tie-down bracket frame 110 can be a standard factory supplied frame or it can be an after-market replacement part to substitute or be exchanged for a factory part. Additional vehicle parts can be exchanged for the tie-down bracket frame 110. Preferably, the vehicle part is a factory part that is located on one or both of the sides of the vehicle, such as running boards, roof racks, door handles, window frames, wheel covers, door frames, or other suitable car part. Alternatively, the vehicle part can be an after-market part that substitutes for a factory part, or one that can be added to a vehicle in a location that has access to power and control wiring. The embodiment disclosed herein is a tie-down bracket frame 110 that is configured to be affixed to a vehicle hood or frame. The tie-down bracket frame 110 further includes a tie-down aperture 170 configured for receiving tie-downs, such as ropes, cables, wires or other securing components. The tie-down bracket frame 110 is configured to allow a user to secure an object to the roof of the vehicle.

Embodiments of the tie-down bracket frame 110 can be prepared from cast aluminum, steel, titanium, plastic, ceramics, polycarbonates, billet aluminum, or composites. Embodiments prepared from cast aluminum are lightweight and provide improved electrical qualities, and therefore do not require a separate heat sink.

The light source 120 provides lighting and illumination to the vehicle part. The light source 120 is preferably side facing and thereby provides illumination and lighting in a lateral direction to the direction of movement of the vehicle. The light source 120 can be light emitting diodes (LED) lighting affixed to an LED circuit board. The light source 120 can also be incandescent, halogen, or other suitable lighting source. The light source 120 can provide a single color of light or it can provide multiple colors. The number of LEDs that can be incorporated into the light source is dependent on the size of the cavity 160 into which the light source 120 is mounted and/or affixed. The light emitting diode circuit board and light emitting diodes are configured to emit light in multiple colors and patterns. The LED circuit board, and/or an internal control system in the vehicle can be programed and/or contain programming for a series of response from the light source in view of actions of the vehicle, including, but not limited to stopping, starting, turning, idling, slowing down, or speeding up. The responses from the light emitting diodes can include, but are not limited to, flashing colors, flashing patterns, constant light, rainbow effects, strobe lighting, or other features suitable for a vehicle.

The LEDs in the light source 120 can be arranged in rows, columns, patterns, designs or other suitable arrangements. The LEDs can be configured to flash in sequences, in patterns, or in response to actions of the vehicle or directions from the user. The light source includes or is separately attached to a power source, a power converter, controllers, and all electrical and power systems configured to power and/or control the light source 120.

The light source 120 includes an exterior light source surface 122 that emits light, and a rear light source surface 124 that includes electrical connections 126 for attachment to electrical power and control systems. Additionally, the rear light source surface 124 is configured for attachment to the cavity 160 of the tie-down bracket frame 110. Embodiments of the light source 120 can have a rounded or convex exterior light source surface 122. Alternative embodiments of the light source 120 can have flat exterior light source surfaces 122, concave, patterned, ridged, fish eyed, or other suitable configurations. Embodiments of the light source 120 can include a light source frame 128 that surrounds the light source 120 and is configured to allow the light source to be affixed to the exterior cavity surface 162 and/or the interior gasket surface 131.

The light source 120 is affixed to the tie-down bracket frame 110 via attachment apertures 112 that are disposed in an interior cavity surface 161 of the cavity 160. Embodiments can include between 2 and 20 attachment apertures 112, preferably between 1 and 20 attachment apertures, most preferably between 2 and 20 attachment apertures. Embodiments can be prepared with 2 attachment apertures 112 for affixing the light source 120 to the tie-down bracket frame 110.

A gasket 130 can be affixed either to the light source 120 distal to the tie-down bracket frame 110 in relation to the light source 120, or directly to the tie-down bracket frame 110. When the gasket 130 is affixed directly to the tie-down bracket frame via cavity apertures 116, the gasket 130 assists in holding the light source 120 within the lighting assembly components. In an embodiment, the cavity 160, light source 120, gasket 130, lens 140 and bezel 150 are generally rectangular. Embodiments of the gasket 130 can have an interior gasket surface 131 facing the cavity 160 and an exterior gasket surface 132 facing the lens 140.

In an embodiment, the gasket 130 frames the light source 120 surrounding the exterior light source surface 122 and/or bordering the exterior light source surface 122. Alternatively, the gasket 130 can be affixed around the exterior light source surface 122 and directly affixed to the tie-down bracket frame 110 via the cavity apertures 116 and gasket apertures 136. Embodiments of the gasket 130 include a gasket upper horizontal side 133, a gasket lower horizontal side 134, and gasket vertical sides 135. Different shapes of the cavity 160 and associated components can be prepared and are envisioned by the present application. In an embodiment the gasket 130 is generally rectangular and it can have pre-drilled and counter sunk gasket apertures 136 configured for receiving screws, bolts, rivets, an adhesive, or other suitable securing means. In an embodiment the gasket is greater in length than in height. In such an embodiment the gasket 130 can have between 2 and 50 gasket apertures 136 disposed in its exterior gasket surface 132, preferably between 4 and 25, and most preferably between 6 and 15 gasket apertures 136. Embodiments can include ten gasket apertures 136.

The gasket 130 can be prepared from rubber, silicon, acrylics, plastics, adhesive, or other suitable materials that provides a protection to the light source without adding unnecessary weight or electrical conductive issues. Embodiments of the gasket 130 can be configured to provide weatherproofing and reduce electrical exposure of the lighting assembly components in an assembled configuration.

In embodiments the lens 140 is positioned between the gasket 130 and the bezel 150. Embodiments of the lens 140 are generally rectangular, but various shapes, sizes, depths, configurations, concavities, or other features are envisioned by the present application. The lens 140 includes a lens frame 141 that further includes a lens frame interior surface 142, and a lens frame exterior surface 143. The lens frame 141 can be contiguous with the lens 140 and/or the lens frame 141 can be a separate component affixed to the lens 140. In an embodiment the lens 140 is greater in length than in height.

Embodiments of the lens 140 can have an interior lens surface 144 facing the gasket 130 and light source 120, and an exterior lens surface 145 facing the bezel 150 and directed outwards laterally from the vehicle. Embodiments of the interior lens surface 144 can be flat, concave, convex, patterned, domed, or other suitable shapes and configurations. A preferred embodiment includes a concave interior lens surface 144. The exterior lens surface 145 can be flat, concave, convex, patterned, domed, or other suitable shapes and configurations. A preferred embodiment includes a flat exterior lens surface 145.

Embodiments of the lens 140 are configured to provide a wide angle of illumination, and to enhance the colors of the light source 120. Embodiments of the lens 140 can provide a floodlight pattern to the light emitted from the light source 120. Embodiments of the lens 140 can provide a full range or light or block certain wavelengths.

In such an embodiment the lens 140 can have between 2 and 50 lens apertures 146 disposed in the lens frame 141, preferably between 4 and 25, and most preferably between 6 and 15 lens apertures 146. Embodiments can include ten lens apertures 146. The lens 140 can be prepared from polycarbonates, such as Lexan, glass, fiberglass, acrylics, plastics, or other suitable materials that provides a filtration, amplification, color, or texture, without adding unnecessary weight or electrical conductive issues.

As illustrated in FIG. 1, the interior lens surface 144 and exterior lens surface 145 cover the surface area of the lens 140, whereas the gasket 130 and bezel 150 frame the light source 120 and lens 140. Embodiments of the gasket 130 and bezel 150 include open interior sections that frame the light source 120 and lens 140.

A bezel 150 can be affixed to the lens 140 distal to the tie-down bracket frame 110 in relation to the light source 120 and lens 140. In an embodiment the bezel 150 is a generally rectangular frame. Embodiments of the bezel 150 can have an interior bezel surface 151 facing the lens 140 and an exterior bezel surface 152 facing laterally outward from the vehicle. In an embodiment, the bezel 150 frames the lens 140 generally bordering the lens frame 141. Embodiments of the bezel 150 include a bezel upper horizontal side 153, a bezel lower horizontal side 154, and bezel vertical sides 155. Different shapes of the cavity 160, and associated lighting components, such as the bezel 150, can be prepared and are envisioned by the present application. In an embodiment the bezel 150 is generally rectangular and can have pre-drilled and counter sunk bezel apertures 156 configured for receiving screws, bolts, rivets, or other suitable securing means.

In an embodiment the bezel 150 is greater in length than in height. In such an embodiment the bezel 150 can have between 2 and 50 bezel apertures 156 disposed in its exterior bezel surface 152, preferably between 4 and 25, and most preferably between 6 and 15 bezel apertures 156. Embodiments can include ten bezel apertures 156.

The bezel 150 can be prepared from polycarbonates, rubber, silicon, acrylics, plastics, or other suitable materials that provide protection to the lens frame 141 and secure the lighting components to the tie-down bracket frame 110. Embodiments of the bezel 150 are prepared from materials that do not add unnecessary weight or electrical conductive issues.

In an embodiment the light source 120 is configured to be affixed to the cavity 160 of the tie-down bracket frame 110 via the attachment apertures 112 disposed on the interior cavity surface 161. The interior gasket surface 131 is configured to be affixed to the exterior cavity surface 162 or the light source frame 128. The lens frame interior surface 142 is configured to be affixed to the exterior gasket surface 132, and the interior bezel surface 151 is configured to be affixed to the lens frame exterior surface 142. The lighting assembly components are configured to provide light laterally to the forward direction of movement or a backward direction of movement of the vehicle (i.e., the direction the vehicle moves when in drive or reverse).

Embodiments of the lighting assembly components are insulated and weatherproofed to protect the components and electrical wiring from weather, exterior electrical sources, impact and other events that can disrupt the working of the side-facing lighting system.

Figure 2:
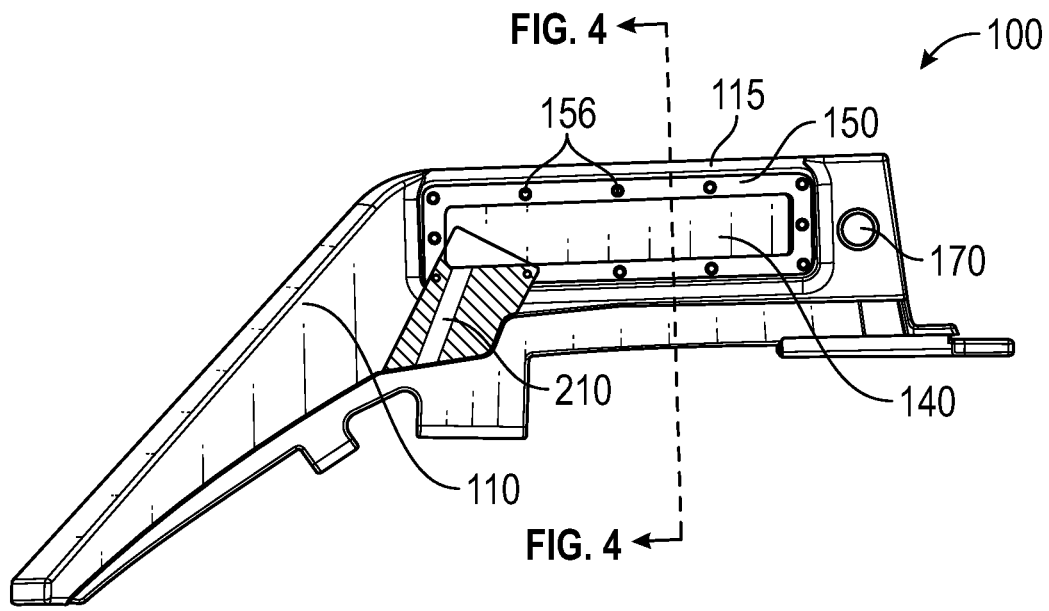
FIG. 2 illustrates a tie-down bracket with side facing lighting, according to an embodiment.

FIG. 2 is a tie-down bracket with side facing lighting 100 in an assembled construction, according to an embodiment. As illustrated in FIG. 2, the bezel 150 is securely mounted onto the lens 140. The bezel 150 and the lens 140 (not including the lens frame 141) are the only components visible in the flush mounted assembly.

Depicted in FIG. 2 is a wiring assembly channel 210 that is located internally in the tie-down bracket frame 110. The wiring assembly channel 210 allows for wiring (not shown) to run from the light source 120 through the tie-down bracket frame 110 and into the vehicle. In the embodiment shown the wiring can run through the wiring assembly channel 210 into the hood of the vehicle and connect with the vehicle electrical power and control systems. The wiring assembly channel 210 is disposed within the tie-down bracket frame 110 and configured to receive wiring from the light source 120 and connect the wiring from the light source to the vehicle. Embodiments of the wiring assembly channel 210 are insulated and weather proofed to protect the electrical components and the lightning assembly components. Embodiment of the wiring assembly channel 210 are configured for wiring electrical control and power components to the light source via the wiring assembly channel 210 that is disposed within the tie-down bracket frame 110. The wiring assembly channel 210 further connects the light source 120 to the vehicle control system allowing the vehicle computer or user to control the side-facing lights. The wiring for the light source 120 can be connected to hazard light controls, blinker light controls, auxiliary lighting controls, head light controls, rear light controls and combinations thereof.

Figure 3:
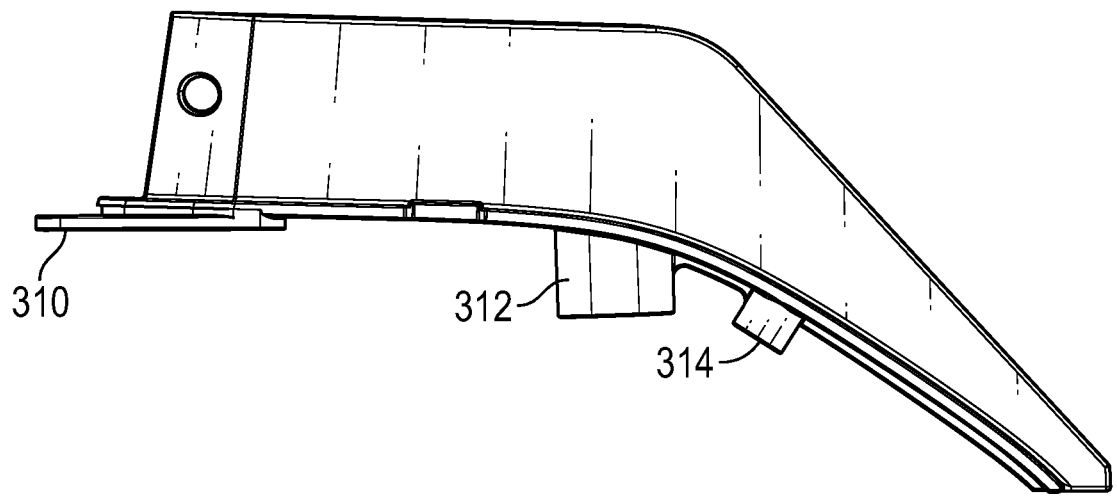
FIG. 3 illustrates a tie-down bracket with side facing lighting, according to an embodiment.

FIG. 3 illustrates a rear view of the tie-down bracket frame 110. As shown in the rear view the tie-down aperture 170 passes completely through the tie-down bracket frame 110 allowing users to connect ropes, wires, cables, or other securing means to hold objects on the roof of the vehicle. Also depicted in FIG. 3 are connection tabs 310, 312 and 314 that are configured to attach, affix, or mount the tie-down bracket frame 110 to the vehicle. Various configurations and embodiments of the connection tabs 310, 312, 314 are envisioned for the tie-down bracket frame. Embodiments of the connection tabs 310, 312, 314 are configured to affix the tie-down bracket frame 110 to a vehicle, and more specifically affixed to a hood or roof of a vehicle. Embodiments can mimic the connection tabs of standard factory parts or can be configured for extra support and ruggedness for high-stress, high-impact off-road vehicles.

Figure 4:
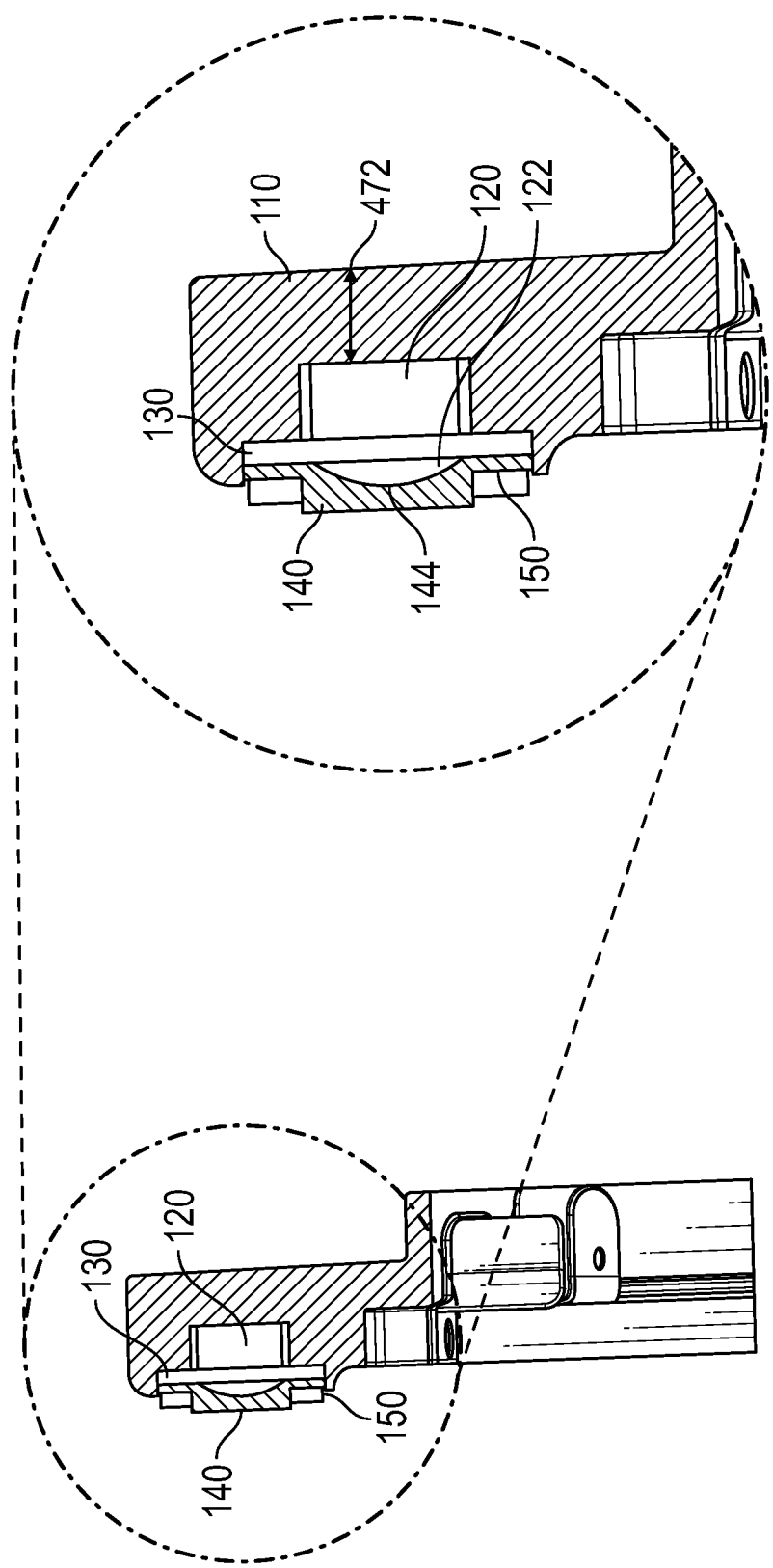
FIG. 4 illustrates a tie-down bracket with side facing lighting, according to an embodiment.

FIG. 4 illustrates a head-on cutaway view of the tie-down bracket frame with side facing lighting 100 and a zoomed in section thereof, according to an embodiment. In the zoomed-in cross-section shown in FIG. 4, the lighting assembly components can be viewed in an assembled format. The light source 120 is embedded in the cavity 160 of the tie-down bracket frame 110. Affixed to the light source 120 is the gasket 130. Affixed to the gasket 130 is the lens 140.

The concave interior lens surface 142 accommodates the convex exterior light source surface 122.

As illustrated in FIG. 4, the light source 120 extends from the cavity 160 and beyond the gasket 130. In an embodiment, exterior light source surface 122 is convex and the interior lens surface 144 is concave, and the exterior light source surface 122 projects laterally beyond (distally away from the cavity) the gasket 130 in an assembled lighting assembly component configuration.

Embodiments of the tie-down bracket side-facing lighting 100 can be prepared where the lighting source is flush with the gasket 130 and/or the lens 140 protrudes inward past the gasket 130 towards the light source 120. Alternatively, both the light source 120 and the lens 140 can be flush with the gasket 130.

Figure 5:
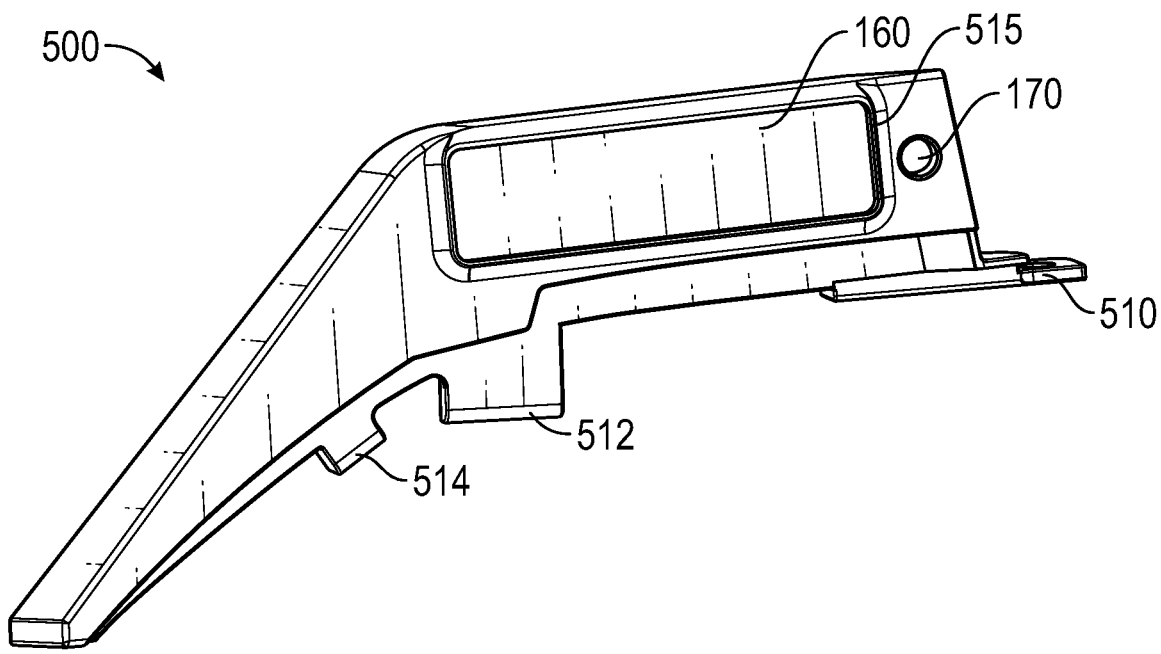
FIG. 5 illustrates an alternative tie-down bracket with side facing lighting, according to an embodiment.

FIG. 5 is an alternative tie-down bracket frame 500, according to an embodiment. As illustrated in FIG. 5 the cavity 160 has a lesser depth and can accommodate smaller and lighter lighting assembly components. The tie-down bracket frame 500 includes a raised lip 515 that is configured to accommodate the lighting assembly components. The size, shape, contours, and features of the raised lip 515 can be varied to provide protection to the lighting assembly components and/or ease of assembly for the lighting assembly components with the tie-down bracket frame 500.

FIG. 5 further illustrates alternative connection tabs 510, 512 and 514 for attaching or affixing the tie-down bracket frame 500 to the vehicle. Different connection tabs 510, 512, 514 that are configured to be attached to the vehicle via tabs, bolts, screws, rivets, adhesive, or other securing means are envisioned by the present application.

Figure 6:
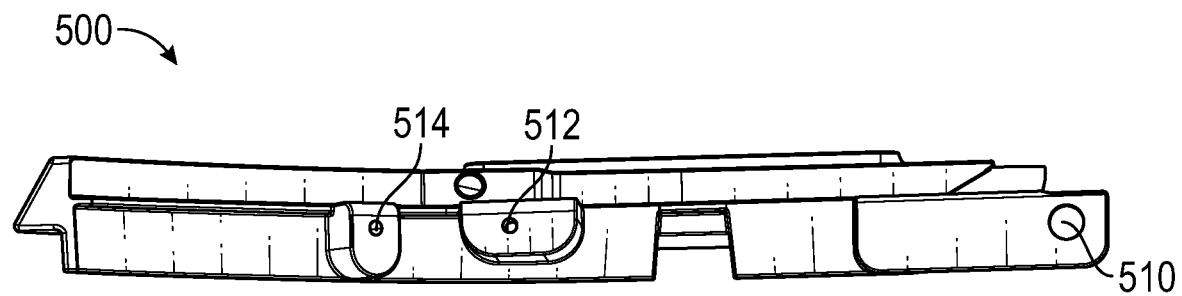
FIG. 6 illustrates an alternative tie-down bracket with side facing lighting, according to an embodiment.

FIG. 6 is a bottom view of the tie-down bracket frame 500, according to an embodiment. FIG. 6 further illustrates alternative connection tabs 510, 512 and 514 for attaching or affixing the tie-down bracket frame 500 to the vehicle. The view in the embodiment in FIG. 6 is from below the tie-down bracket frame 500 and illustrates apertures in the connection tabs 510, 512, 514 for bolts, screws, rivets, or other securing means to attach the tie-down bracket frame 500 to the vehicle.

Figure 7:
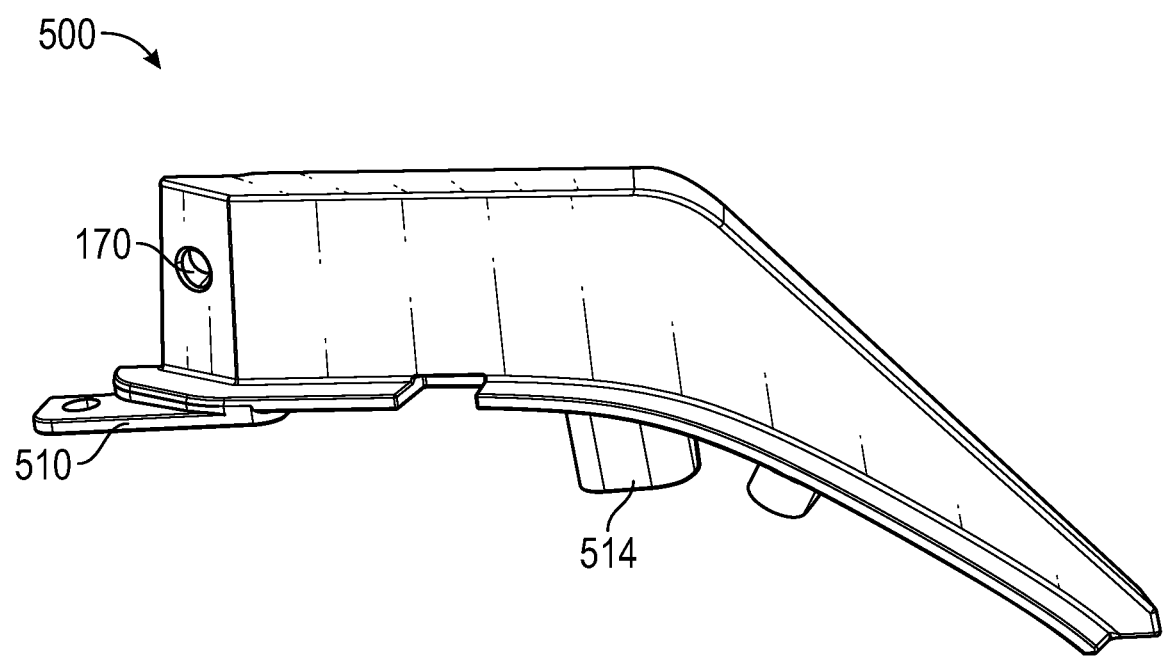
FIG. 7 illustrates an alternative tie-down bracket with side facing lighting, according to an embodiment.

FIG. 7 is a back view of the tie-down bracket frame 500, according to an embodiment. FIG. 7 further illustrates alternative connection tabs 510 and 514 for attaching or affixing the tie-down bracket frame 500 to the vehicle.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device, comprising:
   a tie-down bracket frame configured to be affixed to a vehicle, wherein the tie-down bracket frame further comprises:
     a tie-down aperture configured to receive a securing component,
     a cavity disposed in a surface of the tie-down bracket frame, wherein the cavity comprises an interior cavity surface and an exterior cavity surface, and
   lighting assembly components disposed in the cavity, the lighting assembly components comprising:
     a light source, wherein the light source comprises: an exterior light source surface; and
       a rear light source surface;
     a gasket, wherein the gasket comprises: an interior gasket surface;
       an exterior gasket surface, formed to contain between 6 and 15 apertures disposed in the exterior surface and formed to receive fasteners;
       a gasket upper horizontal side;
       a gasket lower horizontal side;
       and gasket vertical sides;
     a lens, wherein the lens comprises:
       a lens frame comprising a lens frame exterior surface and a lens frame interior surface;
       an interior lens surface;
       and an exterior lens surface;
     a bezel, wherein the bezel comprises: an interior bezel surface;
       an exterior bezel surface;
       a bezel upper horizontal side;
       a bezel lower horizontal side;
       and bezel vertical sides; and
   wherein:
     the tie-down bracket frame is formed to contain a raised lip sized to accommodate the lighting assembly components;
     the light source is configured to be affixed to the interior cavity surface of the tie-down bracket frame and the length of the gasket is greater than the height;
     the interior gasket surface is configured to be affixed to the exterior cavity surface and further configured to frame the light source by surrounding;
     the lens frame interior surface is configured to be affixed to the exterior gasket surface;
     the interior bezel surface is configured to be affixed to the lens frame exterior surface; and
     the lighting assembly components are configured to provide light laterally to a forward direction of movement of the vehicle.

2. The device of claim 1, wherein the tie-down bracket frame:
   comprises a wiring assembly channel disposed within the tie-down bracket frame; and
   is configured to receive wiring from the light source and connect the wiring from the light source to the vehicle.

3. The device of claim 1, wherein:
   the exterior light source surface is convex and the interior lens surface is concave; and
   the exterior light source surface projects laterally beyond the gasket in an assembled lighting assembly component configuration.

4. The device of claim 1, wherein:
   the tie-down bracket frame comprises attachment brackets configured to affix the tie-down bracket frame to a vehicle; and
   the tie-down bracket frame is affixed to a hood of a vehicle.

5. The device of claim 1, wherein:
   the light source further comprises a light emitting diode circuit board and light emitting diodes; and the light emitting diodes are configured to emit light in multiple colors and patterns.

6. The device of claim 1, wherein the lens is prepared from polycarbonate, and the lens is configured to provide a wide angle of illumination, and to enhance colors of the light source.

7. The device of claim 1, wherein:
the gasket is prepared from rubber, silicone, plastics or adhesive; and
the gasket is configured to provide weatherproofing and reduce electrical exposure of the lighting assembly components in an assembled configuration.

8. The device of claim 1, wherein:
the tie-down bracket is prepared from cast aluminum; and
the tie-down bracket is an after-market part that is configured to be exchanged with a factory installed part on a vehicle.

9. A method, comprising:
providing side-facing lighting for a vehicle via lighting assembly components, wherein the lighting assembly components comprises:
a light source, wherein the light source further comprises an exterior light source surface and a rear light source surface;
a gasket, wherein the gasket further comprises an interior gasket surface and an exterior gasket surface between 6 and 15 apertures disposed in the exterior surface and formed to receive fasteners and, wherein, the length of the gasket is greater than the height;
a tie-down bracket frame, formed to contain a raised lip sized to accommodate the lighting assembly components;
a lens, wherein the lens further comprises a lens frame exterior surface, and a lens frame interior surface, an interior lens surface, and an exterior lens surface; and
a bezel, wherein the bezel further comprises an interior bezel surface and an exterior bezel surface; and
wherein the lighting assembly components are prepared by:
affixing a rear light source surface to an interior cavity surface of the tie-down bracket frame;
affixing an interior gasket surface to an exterior cavity surface of the tie-down bracket frame;
affixing a lens frame interior surface to the exterior gasket surface; and
affixing an interior bezel surface to the lens frame exterior surface.

10. The method of claim 9, wherein:
the exterior light source surface is
convex; the interior lens surface is
concave; and
the lens is configured to provide a wide angle of illumination.

11. The method of claim 9, wherein:
the tie-down bracket frame further comprises attachment brackets configured to be attached to a hood of a vehicle; and
the lighting assembly components are configured to provide light laterally to a forward direction of movement of the vehicle.

12. The method of claim 9, further comprising:
wiring electrical control and power components to the light source via a wiring assembly channel disposed within the tie-down bracket frame, wherein the wiring assembly channel connects the light source to a vehicle control system.

13. The method of claim 9, wherein the light source further comprises a light emitting diode circuit board and light emitting diodes, the method further comprising:
programming a series of responses from the light emitting diodes in view of actions of the vehicle, wherein the actions of the vehicle include stopping, starting, turning, idling, slowing down, or speeding up.

14. The method of claim 13, wherein responses from the light emitting diodes comprises flashing colors, flashing patterns, constant light, rainbow effects, or strobe lighting.

15. A system, comprising:
lighting assembly components, the lighting assembly components comprising:
a light source;
a gasket comprising between 6 and 15 apertures disposed in an exterior gasket surface and formed to receive fasteners;
a lens; and
a bezel,
wherein:
the light source is configured to be affixed to an interior cavity surface of a tie-down bracket frame;
an interior gasket surface is configured to be affixed to an exterior cavity surface of the tie-down bracket frame;
a lens frame interior surface is configured to be affixed to the exterior gasket surface;
an interior bezel surface is configured to be affixed to a lens frame exterior surface;
the tie-down bracket frame formed to contain a raised lip sized to accommodate the lighting assembly components; and
the lighting assembly components are configured to provide light laterally to a forward direction of movement of the vehicle.

16. The system of claim 15, wherein:
the light source further comprises a light emitting diode circuit board and light emitting diodes; and
the light emitting diodes are configured to emit light in multiple colors and patterns; and
the light emitting diode circuit board is programmed with a series of responses from the light emitting diodes in view of actions of the vehicle, wherein:
the actions of the vehicle include stopping, starting, turning, idling, slowing down, or speeding up; and
responses from the light emitting diodes comprise flashing colors, flashing patterns, constant light, rainbow effects, or strobe lighting.

17. The system of claim 15, wherein:
the lens is prepared from polycarbonate;
the lens is configured to provide a wide angle of illumination;
the gasket is prepared from rubber, silicone, plastics, or adhesive; and
the gasket is configured to provide weatherproofing and reduce electrical exposure of the lighting assembly components in an assembled configuration.

18. The system of claim 15, wherein:
the light source is configured to be affixed to the tie-down bracket frame; the gasket is configured to be affixed to the tie-down bracket frame;
an exterior light source surface is convex and an interior lens surface is concave, and the exterior light source surface projects laterally beyond the gasket in an assembled lighting assembly component configuration; and
the lens is configured to be affixed to the gasket, and the bezel is configured to be affixed to the lens.

19. The system of claim 15, wherein:
the light source is configured to be affixed to the tie-down bracket frame;
the gasket is configured to be affixed to the light source;
the lens is configured to be affixed to the gasket, wherein the lens includes a lens frame that is contiguous with the lens or is a separate component affixed to the lens;
and the bezel is configured to be affixed to the lens.

20. The system of claim 18, wherein:
a wiring assembly channel is disposed within the tie-down bracket frame;
the wiring assembly channel and the tie-down bracket frame are prepared from cast aluminum; and
the wiring assembly channel is configured to connect wiring between the light source and the vehicle wherein the wiring assembly channel connects the light source to hazard light controls, blinker light controls, auxiliary lighting controls, head light controls, or rear light controls.

\* \* \* \* \*